# 2,700,669

HYDROXYBENZOTRIAZOLE CARBOXYLIC ACIDS

Mario Scalera, Somerville, and Frederic Henry Adams, Bound Brook, N. J., assignors to American Cyanamid Company, New York, N. Y., a corporation of Maine No Drawing. Application September 27, 1951, Serial No. 248,656

6 Claims. (Cl. 260—308)

The present invention refers to substituted 5-hydroxy-1,2,3-benzotriazoles of the formula

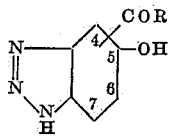

in which R is hydroxyl or a carbocyclic aromatic amino radical, and in which the carbonyl group is in position ortho to the hydroxy substituent.

When R is a carbocyclic aromatic amino radical, that is to say, when the arylide of the benzotriazole is produced, any of the common aromatic amino radicals may be present, such as those derived from aniline, o-toluidine, p-toluidine, p-anisidine and phenetidine, 4-chloro-2-methylaniline, m- and p-nitraniline, alpha- and beta-naphthylamine, benzidine, dianisidine, 2,5-dimethoxyaniline, 5-chloro-2-methoxyaniline, p-chloroaniline and the like.

The resulting arylides may be converted into azoic coloring matters, by coupling with diazotized fast bases. These coloring matters may be produced in substance or on a substrate and used as pigments; or they may be prepared on textile materials according to the procedures commonly used for the production of ice colors. For example, cellulosic materials may be impregnated with an alkaline solution of an arylide of the present invention, and the cloth thus padded may be either dyed by immersion in a solution of a diazonium salt or printed with a paste containing such a salt in solution. Another method of utilizing the products of the present invention consists in mixing the arylide with a water-soluble diazo imino compound, alkali and thickener to form a printing paste, printing this paste upon the fiber and then exposing the print to the hot vapors of an organic acid, such as acetic or formic acid, to develop the colored pattern. Still another method comprises mixing the arylides with diazo sulfonates and an oxidizing agent, dissolving the mixture in dilute alkali, thickening with a suitable thickener, printing upon cellulose and developing the colored pattern on the fiber in the presence of weakly acidic vapors. The arylides of the present invention can be coupled with the diazonium salt of substantially any aromatic mono or diamine. Of particular interest are the aromatic amines, free from solubilizing substituents, such as the sulfonic and carboxylic acid groups, which are capable of being diazotized or tetrazotized and coupled to form azo dyestuffs. The following are some typical examples: aniline, its homologs, their halogen, nitro, alkoxy, aryloxy, acylamino, sulfone, sulfonamide, cyano derivatives, xenylamine, the naphthylamines, aminoazo compounds, benzidine, dianisidine. 4,4'-diaminostilbene and its derivatives and the like. Diamines containing only one diazotizable amino group, such as 2,6-dichloro-1,4-phenylenediamine, can be employed. If the aromatic amine contains more than one substituent, these may be either the same or different as, for example, in 2-methoxy-5-chloroaniline.

When R is hydroxyl in the above formula, that is, when a hydroxy benzotriazole carboxylic acid is used, the products are useful as coupling components for a variety of azoic coloring matters, azo dyes and pigments. The resulting o-hydroxycarboxylic acids can be coupled with a wide variety of diazotized amines, the precise choice of which will depend upon the particular purpose to which the product is to be put. For example, 5-hydroxy-1,2,3-benzotriazole-6-carboxylic acid may be coupled with a diazotized aminosulfonic acid of the benzene or naphthalene series, giving rise to acid dyes, which may be converted, if desired, to pigment lakes of an alkali or alkaline earth metal such as sodium, potassium, barium, or calcium. Suitable diazo components for these uses are, for example, 2-chloro-5-aminotoluene-4-sulfonic acid, 2-naphthylamine-3,6-disulfonic acid, 1-naphthylamine-6-sulfonic acid, 1-naphthylamine-4,8-disulfonic acid, naphthionic acid and sulfanilic acid.

The compounds of the present invention are useful as coupling agents for the preparation of azo coloring matters. The new dyes are not, however, claimed in the present application, constituting the subject matter of our co-pending application, Serial No. 248,655 filed September 27, 1951, now Patent No. 2,675,376.

While the new compounds of the present invention are claimed regardless of the method by which they are prepared, it is an advantage of the present invention that there are available a number of simple methods for the production of the new compounds. Thus, for example, the 5-hydroxy-benzotriazole-4-carboxylic acid may be produced by subjecting the corresponding 5-hydroxy-1,2,3-benzotriazole to the well known Kolbe reaction. The reaction proceeds smoothly and satisfactory yields of compounds are obtainable. Another method of preparing these compounds starts with 4-aminosalicylic acid, which is then converted into its ureide, aminated by coupling with a diazo compound and reducing. This serves to produce a compound having an amino group in the 5 position and a ureido group in position 4. This compound can then be cyclized to 5-hydroxy-1,2,3-benzotriazole-6-carboxylic acid by simple methods, which will be described in detail in the examples of the present application.

The hydroxy benzotriazole carboxylic acids can readily be converted into the corresponding arylides by treatment with phosphorus trichloride and the respective arylamine in an organic solvent. The process does not require critically controlled conditions and proceeds smoothly with good yields. This type of process is not, in itself, new, but has been used to prepare arylides of other carboxylic acids.

The invention will be described in greater detail in conjunction with the specific examples, the parts being by weight unless otherwise specified.

EXAMPLE 1

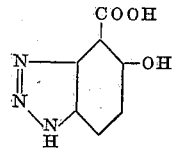

5-hydroxy-1,2,3-benzotriazole-4-carboxylic acid

A nickel lined, steel autoclave is charged with an intimate mixture of 20 parts of 5-hydroxy-1,2,3-benzotriazole, 95.5 parts of anhydrous potassium carbonate, and 115 parts of solid glass beads. The mixture is heated in the autoclave with open vent for 6 hours at 160–165° C., and then under 600 lbs. of carbon dioxide for 16 hours at 180–190°. The contents of the autoclave are then dissolved in 600 parts of water, decanted from the glass beads, heated with 5 parts of charcoal and 5 parts of siliceous filter aid, and filtered. The product separates on acidification. It can be purified by solution in sodium hydroxide followed by acidification to pH 6, filtration, and charcoal decolorization. On strong acidification the product separates and may be filtered and recrystallized from water. It melts at approximately 210° C. It couples with diazotized p-nitraniline in acid solution to give a bright reddish-orange product, and in alkaline solution to give a reddish-violet product.

EXAMPLE 2

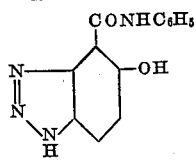

*5-hydroxy-1,2,3-benzotriazole-4-carboxylic aniline*

A solution of 2.55 parts of the above prepared 5-hydroxy-1,2,3-benzotriazole-4-carboxylic acid in 110 parts of chlorobenzene is dried by distilling out 5 parts of solvent, treated with 1.89 parts of aniline, and cooled to 70° C. There is then gradually added at this temperature a solution of 0.85 part phosphorus trichloride in 50 parts of chlorobenzene. The mixture is heated to 130-135° C., and the reaction completed by refluxing until evolution of hydrogen chloride ceases. The resulting solution is cooled to room temperature, filtered, and extracted with aqueous sodium hydroxide. The product separates on acidification and is filtered. If desired, it can be crystallized from alcohol, and melts at approximately 188° C.

This arylide couples in alkaline solution with diazotized p-nitroaniline to give a dark reddish-brown dye, soluble in caustic alkali and reprecipitated by acetic acid. Diazotized 2,5-dichloroaniline gives an alkali-soluble brownish-orange dye.

EXAMPLE 3

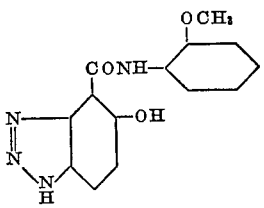

*5-hydroxy-1,2,3-benzotriazole-4-carboxylic-o-anisidide*

This compound is prepared in excellent yield from o-anisidide by the procedure described above for the anilide. It may be crystallized from alcohol. The pure material melts at approximately 215° C.

EXAMPLE 4

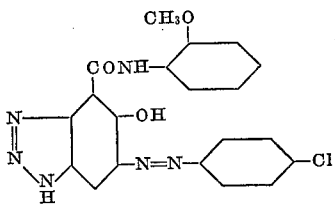

p-Chloroaniline (2.6 parts) is diazotized in the ordinary way with hydrochloric acid and sodium nitrite, and added with stirring to a solution of 6.0 parts of the above prepared 5-hydroxy-1,2,3-benzotriazole-4-carboxy-o-anisidide in 400 parts of water, 40 parts by volume of molar sodium hydroxide and 20 parts by volume of molar sodium carbonate solution. During this operation, more sodium carbonate is added as necessary to maintain alkalinity to phenolphthalein. The brown dye which is produced is acidified, filtered, washed, and dried at 100°.

EXAMPLE 5

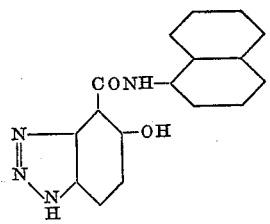

*5-hydroxy-1,2,3-benzotriazole-4-carboxylic alpha-naphthylamide*

Prepared by the above described procedure, and crystallized from alcohol, this product melts at approximately 214° C.

EXAMPLE 6

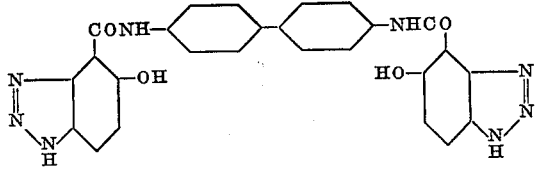

*5-hydroxy-1,2,3-benzotriazole-4-carboxylic benzidide*

This product is prepared by the above described procedures. It shows no melting point up to 300° C.

EXAMPLE 7

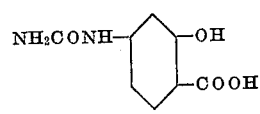

*4-ureidosalicylic acid*

A solution of 16 parts of 4-aminosalicylic acid in 50 parts of water and 24 parts of 5 N sodium hydroxide solution is treated with 8.1 parts of potassium cyanate, and stirred until solution is complete. The resulting solution is cooled to 10-15° C., and carefully acidified with 5 N hydrochloric acid. The resulting thick white precipitate is heated to boiling to redissolve, treated with charcoal, filtered, cooled, and further acidified by additional hydrochloric acid. The product is filtered, and may be recrystallized from water. It melts at approximately 209° C.

EXAMPLE 8

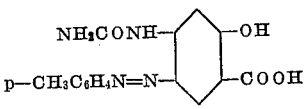

*5-(p-tolylazo)-4-ureidosalicylic acid*

A solution of 38.6 parts of p-toluidine in 234 parts of 5 N hydrochloric acid and 500 parts of water is diazotized in the normal way at 2-3° C. with 5 N sodium nitrite solution. The resulting diazo solution is added with stirring to a solution of 84.5 parts of the above prepared 4-ureidosalicylic acid in 800 ml. of water and 260 parts of 5 N sodium hydroxide, additional sodium hydroxide being added as necessary to maintain strong alkalinity. The reaction mixture is diluted with 500 parts of water, acidified to pH 3 with hydrochloric acid after completion of the coupling, and filtered. The brown dye obtained is dried at 50° C.

EXAMPLE 9

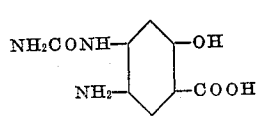

*5-amino-4-ureidosalicylic acid*

To 1000 parts of water and 118 parts of 5 N sodium hydroxide at 60° C., there is added 44.3 parts of the above prepared 5-(p-tolylazo)-4-ureidosalicylic acid and 50 parts of sodium hydrosulfite. The mixture is heated to 80° until practically colorless, held at this temperature approximately one-half hour longer, filtered hot, cooled to 30°, and washed with toluene. Removal of the p-toluidine is completed by adding to the aqueous solution 24 parts of 5 N sodium hydroxide solution, and repeating the toluene extraction. The washed solution is then cooled to 5° C. and acidified to precipitate the white product. The yield can be increased somewhat by salting. The product melts with decomposition in the range 235-240° C., charring at lower temperatures.

EXAMPLE 10

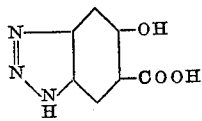

*5-hydroxy-1,2,3-benzotriazole-6-carboxylic acid*

A solution of 4.2 parts of the above prepared 5-amino- 4-ureido-salicylic acid in 100 parts of water and 30 parts of 5 N sodium hydroxide is treated with 16 parts of 5 N hydrochloric acid to precipitate the starting material in finely divided form. The resulting slurry is cooled to 10° C. and treated with approximately 150 parts of the 0.1 N sodium nitrite solution which is added as fast as it reacts. When the reaction is complete, as evidenced by a permanent excess of nitrite, the precipitate is filtered and dried. If desired, it may be purified by boiling with an equal weight of decolorizing charcoal in 100 times its weight in water, filtering, and acidifying with dilute hydrochloric acid. This material does not melt but gradually decomposes at temperatures in the range of 280° C. It couples with diazotized p-nitraniline in acid solution to give a yellowish-orange product, and in alkaline solution to give a deep bluish-violet product.

EXAMPLE 11

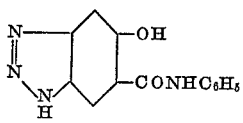

*5-hydroxyl-1,2,3-benzotriazole-6-carboxylic anilide*

The procedure described above is followed, using 490 parts of dry chlorobenzene, 13.5 parts of aniline, and 17.9 parts of 5-hydroxy-1,2,3-benzotriazole-6-carboxylic acid. An excellent yield of product is obtained. It may be purified by dissolving in hot dilute caustic, treating with decolorizing charcoal, filtering, and acidifying. It decomposes at approximately 253° C.

We claim:

1. Monohydroxybenzotriazole carboxylic acids of the formula:

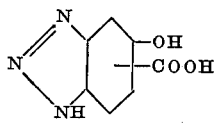

in which the carboxyl group is ortho to the hydroxyl.

2. 5-hydroxy-1,2,3-benzotriazole-4-carboxylic acid of the formula:

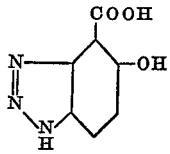

3. 5-hydroxy-1,2,3-benzotriazole-6-carboxylic acid of the formula:

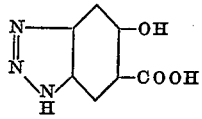

4. A process of producing 5-hydroxy-1,2,3-benzotriazole carboxylic acid which comprises subjecting the corresponding hydroxy-1,2,3-benzotriazole to carboxylation by heating with carbon dioxide under pressure in the presence of an alkali.

5. A process of producing 5-hydroxy-1,2,3-benzotriazole carboxylic acid which comprises reacting salt of 4-amino-salicylic acid with a cyanate to produce a 4-ureidosalicylic acid, coupling the resultant product with a diazotized primary aromatic amine, subjecting the resulting azo compound to reduction, to produce a 4-ureido-5-aminosalicylic acid and reacting the product with sodium nitrite to produce the 5-hydroxy-1,2,3-benzotriazole-6-carboxylic acid.

6. A process of producing a 5-hydroxy-6-carboxy-1,2,3-benzotriazole which comprises treating 5-amino-4-ureido-salicylic acid with nitrous acid in aqueous solution.

References Cited in the file of this patent

FOREIGN PATENTS 636,333   Great Britain _____ Apr. 26, 1950

OTHER REFERENCES

Zincke: Beilstein (Handbuch, 4th ed.), vol. 14, p. 453 (1931).

Goldstein et al.: "Helv. Chim. Acta," vol. 26, pp. 475–81 (1943), cited in Chemical Abstracts, vol. 37, p. 5709 (1943).

Fieser et al.: J. A. C. S., vol. 57, October 1935, 1835–39.